United States Patent [19]

Gardner

[11] 3,867,964

[45] Feb. 25, 1975

[54] APPARATUS FOR PLUGGING PIPE

[75] Inventor: Ronald D. Gardner, Brunswick, Ohio

[73] Assignee: The Pipe Line Development Company, Cleveland, Ohio

[22] Filed: Feb. 1, 1973

[21] Appl. No.: 328,740

[52] U.S. Cl................. 138/89, 137/318, 138/94, 166/55, 251/282
[51] Int. Cl.................... F16k 43/00, F16l 55/10
[58] Field of Search............ 138/90, 91, 89, 94, 97; 166/0.5, 55; 137/318, 15, 320; 251/282

[56] References Cited
UNITED STATES PATENTS

| | | | |
|---|---|---|---|
| 2,237,476 | 4/1941 | Cline | 137/318 X |
| 2,481,013 | 9/1949 | Henderson | 138/90 |
| 2,767,600 | 10/1956 | Mueller et al. | 137/318 |
| 3,370,614 | 2/1968 | Koppl | 138/94 |
| 3,647,108 | 3/1972 | Kemp | 138/90 |
| 3,665,966 | 5/1972 | Ver Nooy | 138/94 |
| 3,766,978 | 10/1973 | Orund et al. | 166/0.5 |
| 3,785,041 | 1/1974 | Smith | 29/471.3 |

FOREIGN PATENTS OR APPLICATIONS

| 78,439 | 11/1894 | Germany | 251/282 |
|---|---|---|---|

Primary Examiner—Richard C. Queisser
Assistant Examiner—Daniel M. Yasich
Attorney, Agent, or Firm—McNenny, Farrington, Pearne & Gordon

[57] ABSTRACT

An improved flow control apparatus for installation on service pipelines of the type in which the line is severed by a cutter enclosed in a fluid tight housing. The end face of a section of pipeline severed by the cutter is sealed by an annular plug. The inside and outside diameters of the annular plug are substantially equal to the inside and outside diameters of the pipeline. The annular configuration of the plug minimizes the plug area subjected to axial pressure forces in the pipeline to limit the force necessary to extend and sealingly engage the plug against the pipeline end face. The apparatus also includes flow passage means for maintaining fluid flow through the other pipeline section and the housing while the first mentioned section remains sealed.

14 Claims, 7 Drawing Figures

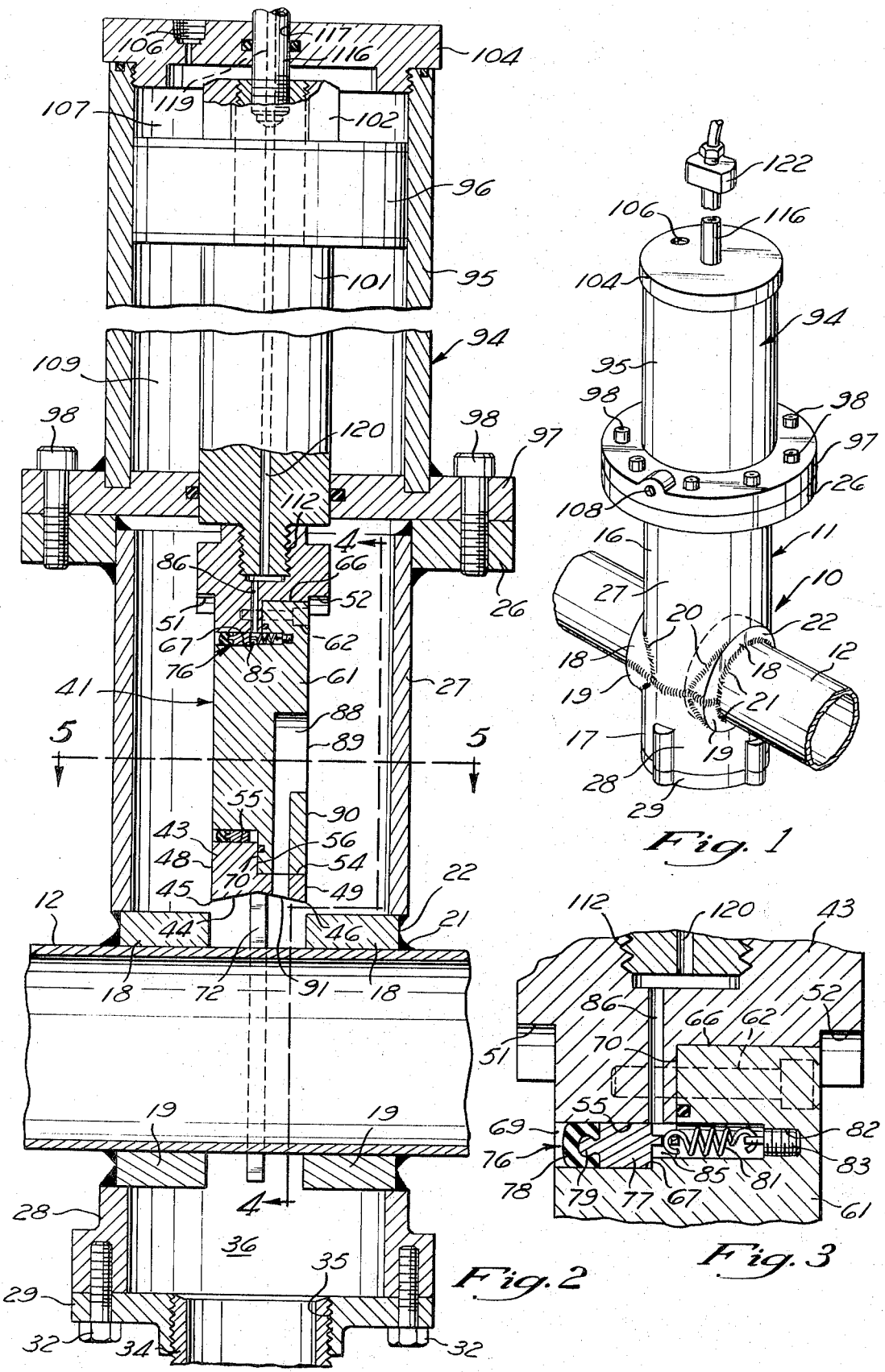

APPARATUS FOR PLUGGING PIPE

BACKGROUND OF THE INVENTION

The invention relates to flow control devices for fluid circuits and, in particular, relates to methods and apparatus for controlling flow in service pipelines or the like.

DESCRIPTION OF THE PRIOR ART

The present invention is an improvement in devices such as disclosed in U.S. Pat. applications Ser. Nos. 196,368 and 196,456 both filed Nov. 8, 1971, now U.S. Pat. No. 3,785,041 and U.S. Pat. No. 3,833,020 respectively, and which are a divisional and a continuation respectively of the application Ser. No. 13,295 filed Feb. 24, 1970, and now abandoned. Such flow control apparatus is primarily intended for use in making repairs or alterations to pipeline circuits which are in service prior to installation of the apparatus. As disclosed in these patent applications, flow may be controlled at a desired location in a live pipeline by operations conducted within a fluid tight housing secured to the line. These operations include cutting radially into the pipe wall with a shear and subsequently plugging a section of the pipe by axially moving a plug into engagement with a pipe section.

With such apparatus the size or diameter of a pipeline may be critical where fluid pressure is relatively high. High line pressure requires correspondingly high forces on the plug to provide an adequate seal with the severed pipe section. The sealing force, acting over a relatively large diameter, may cause undesirable deflection of the plug which in turn may reduce its sealing effectiveness. Where the plug is operated hydraulically, the requisite high sealing force must be developed by a correspondingly high hydraulic system pressure. The elevated hydraulic operating pressure requires more expensive hardware than would ordinarily be used and, despite the use of higher capacity components, may increase the risk of difficulties resulting from failure of the hydraulic plugging circuit.

SUMMARY OF THE INVENTION

The invention is directed to improvements in methods and apparatus for controlling flow in existing pipelines and is particularly suited for applications involving high line pressure and/or large diameter lines. The invention provides plugging means in the form of a ring plug which is arranged to sealingly engage an end face of a pipe section to stop or otherwise control fluid flow through the pipe section. The ring plug is not subjected to axial pressure forces so that the actuating force on the plug required to seal the pipe section is minimized. Moreover, the geometry of the resultant forces on the plug eliminates deflection and improper seating of the plug.

Apparatus embodying the invention preferably includes a housing adapted to be secured to the exterior of a pipeline or other conduit. In the housing is included a shear for cutting through a wall of the pipe. Associated with the shear is a carrier block radially movable between end faces of the pipe formed by operation of the shear. A ring plug is mounted in an annular recess formed on a face of the carrier block transverse to the pipe. The ring plug preferably has inside and outside diameters substantially equal in dimension to the corresponding diameters of the pipe.

The ring plug and the recess form an expansible chamber into which pressurized fluid may be admitted to extend the plug against an opposed pipe end face to thereby seal the associated pipe section. Since there is no significant axial force on the ring developed by pressure in the pipeline, the hydraulic pressure required to extend and seal the ring is minimized.

In accordance with another aspect of the invention, there is provided means to maintain flow through one section of the severed pipe while the other section remains blocked by the plugging means. In the disclosed embodiment of the invention a flow path is formed in the carrier block to conduct fluid from the active pipe section to an area of the housing from which it may be vented into an alternate line.

BRIEF DESCRIPTION OF THE DRAWINGS

FIG. 1 is a perspective view of a flow control apparatus constructed in accordance with the invention.

FIG. 2 is a cross-sectional view of the apparatus in a plane parallel to the longitudinal axis of the pipe.

FIG. 3 is a fragmentary sectional view on an enlarged scale of details of the plugging means and carrier block.

DESCRIPTION OF THE PREFERRED EMBODIMENT

Figure 4:
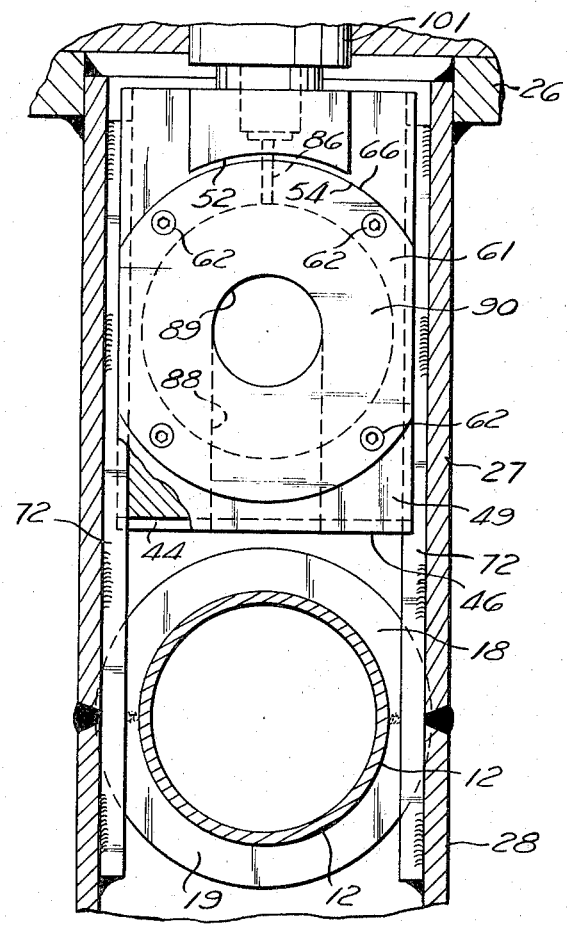
FIG. 4 is a fragmentary cross-sectional view of the apparatus as indicated by the lines 4—4 in FIG. 2.

Referring now to the drawings, FIG. 1 illustrates flow control apparatus 10 having a fluid tight housing 11 secured to the exterior of a pipeline or conduit 12. Preferably, the elements forming the housing 11 are made of steel and are welded together as at 20 to provide a fluid tight structure. The housing 11 comprises upper and lower cylindrical sections 16 and 17 respectively. A pair of axially spaced semi-circular elements or saddles 18 and 19 are welded to each of the cylindrical housing sections 16 and 17 respectively. The housing 11 is secured to the pipe 12 by circumferential weld beads 21 at exposed ends 22 of the saddles 18 and 19.

An annular flange 26 is welded to an upper end of a cylindrical tube 27 of the upper housing section 16. The lower housing section 17 includes a short cylindrical tube 28 to which an end flange 29 is secured by a series of circumferentially arranged bolts 32. The lower end flange 29 includes a bypass port 35 which communicates with an auxiliary pipeline or conduit 34 threaded into or otherwise suitably secured to the flange 29. The cylindrical tube 28 of the housing 17 is sufficiently long to provide a chamber 36 for reception of a slug or coupon formed when the pipe 12 is severed as explained below.

A cutter assembly 41 in the form of a double edged shear is provided in the upper housing 16 for severing the pipe 12. The cutter 41 comprises a generally rectangular carrier block 43 disposed transversely to the axis of the pipe 12. A lower end face 44 of the block 43 includes parallel cutting edges or surfaces 45 and 46 formed at the intersections of the lower end face and opposed vertical faces 48 and 49 of the block 43. At its upper end the carrier block 43 includes a pair of axially projecting shoulders 51 and 52 adapted to index on the saddle elements 18 when the shear 41 has completed cutting the pipe 12.

A pair of coaxial stepped bores 54 and 55 are formed in a central area of the carrier block 43 in parallel axial alignment with the pipe 12. A generally radial surface 56 extends between the bores 54 and 55 within the carrier block 43. A circular insert plug 61 is held in the bores 54 and 55 by a set of circularly arranged bolts 62 threaded into the carrier block 43. The plug 61 includes a pair of cylindrical surfaces 66 and 67 axially coextensive with the respective carrier block bores 54 and 55. The cylindrical insert surface 66 is dimensioned with nominal clearance in the corresponding bore 54 while the other cylindrical surface 67 is somewhat smaller than the associated bore 55 so that the block 43 and insert 61 form an annular cylindrical recess 69. An end wall of the recess 69 is defined by a portion of a radial surface 70 of the insert 61. As illustrated in FIG. 4, the major cylindrical surface 66 of the insert 61 and the major bore 54 of the block 61 are truncated on opposte sides lateral of the pipe for purposes of clearance in the housing 11. A pair of guide bars 72, welded on opposite interior sides of the housing tube 27, support the shear assembly 41 for radial movement relative to the pipe 12.

Figure 5:
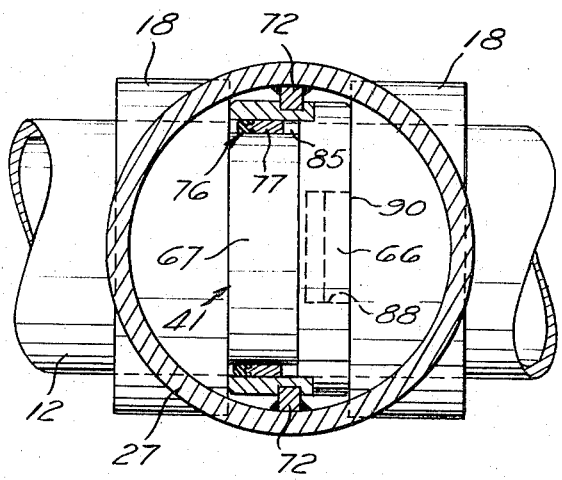
FIG. 5 is a sectional view of the apparatus taken along the lines 5—5 indicated in FIG. 2.

Plugging means in the form of an annular plug assembly 76 comprises a rigid cylindrical ring 77 and a circular elastomeric body 78 attached to the ring 77 as by a circumferential lip 79 integral with the ring. Preferably, the inside and outside diameters of the assembly 76 are substantially equal to the corresponding diameters of the pipe 12. The plug assembly 76 is biased to a retracted position illustrated in FIGS. 2, 3 and 5 in the recess 69 by a plurality of tension springs 81. Only one spring 81 is illustrated in the sectional views of FIGS. 2 and 3. The tension springs 81 are retained by set screws 83 in threaded holes 82 circularly arranged in the insert 61. The plug assembly 76 and recess 69 form an expansible chamber 85 into which pressurized fluid may be admitted through a passage 86 in an upper side of the carrier block 43. On a side 90 of the shear assembly 41 opposite the ring plug 76, there is provided a port 89. A flow passage 88 in the insert 61 and block 43 is adapted to conduct fluid between the port 89 and a port 91 in the lower face 44 of the shear assembly.

The shear assembly 41 is adapted to be driven radially through the pipe 12 with a radial force produced by a linear actuator indicated generally at 94 mounted on the upper housing section 16. The actuator 94 is of the double acting piston and cylinder type and includes a cylinder 95 and a piston 96 movable in the cylinder. An end plate 97, secured to the cylinder 95 by welding for example, forms an end wall for the cylinder 95 and, similarly, provides a closure for the upper end of the housing section 16. The end plate 97 is secured to the annular housing flange 26 by a plurality of bolts 98.

The piston 96 is secured to a piston rod 101 by a retaining nut 102. The upper end of the cylinder 95 is closed by an end flange 104 which is threaded into the cylinder. A port 106 in the end flange 104 is adapted to admit pressurized fluid into a chamber 107 between the end flange and piston 96 to drive the piston downwardly as viewed in the figures. Similarly, a port 108 in the end plate 97 (FIG. 1) is adapted to admit pressurized fluid to a chamber 109 between this end plate and the piston 96 to drive the piston upwardly. A lower extension 112 on the piston rod 101 is threaded into the carrier block 43 of the shear assembly 41 so that the shear assembly is positively driven by the piston 96.

A cylindrical extension tube 116 is threaded into the piston rod 101 and extends outwardly of the actuator 94 through a central bore 117 in the end flange 104. A central passage 119 in the tube 116 communicates with a similar passage 120 in the piston rod to conduct pressurized fluid from a source (not shown) coupled to an outer end 122 of the extension tube (FIG. 1) to the carrier block passage 86 and ultimately to the expansible chamber 85.

After the housing 11 is assembled and welded or otherwise sealingly secured around the exterior of the pipe 12, the actuator 94 may be bolted to the upper housing flange 26. The wall of the pipe 12, preferably, is partially notched by a pipe cutter or similar device on the planes of shear defined by the cutting edges 45 and 46 of the shear assembly 41 on arcs of between about 60° and about 90° adjacent the cutting face 44 of the shear prior to assembly of the housing 11 on the pipe. This prenotching facilitates the cutting action of the shear assembly 41.

Figure 6:
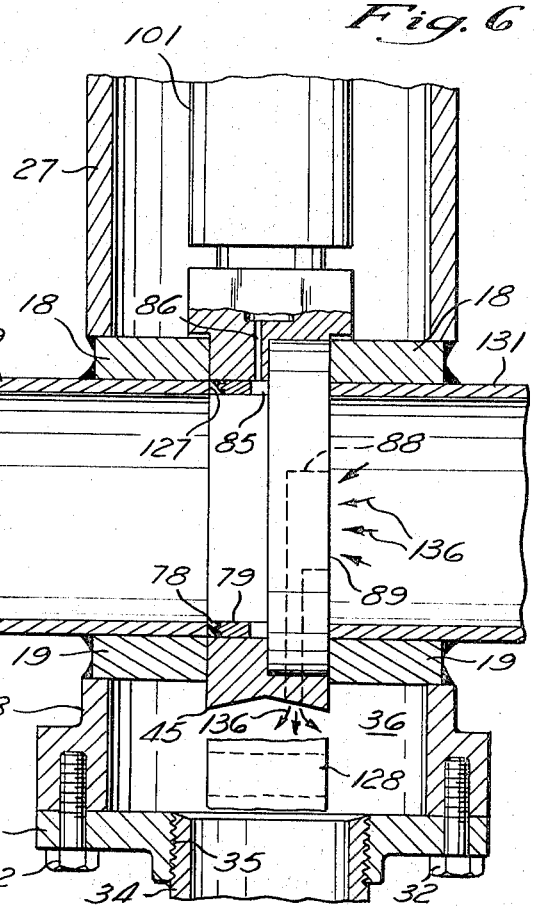
FIG. 6 is a fragmentary sectional view similar to FIG. 2 illustrating the plugging means in sealing engagement with an end face of a severed pipe section.

The shear assembly 41 is moved radially into the pipe 12 by supplying pressurized fluid to the chamber 107 on the upper side of the piston 96. The shear assembly 41 moves from the position in the upper housing 16 illustrated in FIGS. 2 and 4 to the position illustrated in FIG. 6 where the indexing shoulders 51 and 52 engage the adjacent saddle elements 18 and the plug assembly 76 is registered with a pipe end face 127 (FIG. 6) formed by the cutting edge 45. The shear assembly 41 severs an axial section or coupon 128 from the pipe 12 and forces the coupon into the lower housing chamber 36. The coupon 128 as illustrated in FIG. 6 is flattened as it is formed or cut from the pipe.

The plug assembly 76 is extended into sealing engagement with the pipe end face 127 by introducing pressurized fluid into the expansible chamber 85 through the passages 119, 120, and 86. With the plug assembly 76 extended against the pipe end face 127 fluid communication between the associated section of pipe 129 and both the housing 11 and the opposite pipe section, designated 131 is prevented. It may be appreciated that fluid pressure in the pipe section 129 acts only on an annular area defined by the inside and outside diameters of the ring plug assembly 76 when the assembly is moved into engagement with the end face 127. Since the pipe pressure does not act on a circular area defined by the outside diameter of the plug as in prior devices, only a relatively small force is required to extend and sealingly engage the ring plug assembly 76.

This allows the fluid pressure operating in the expansible chamber 85 and associated passages 86, 120 and 119 to be relatively low. Accordingly, the elements comprising this plugging system may be fabricated of ordinary materials without a risk of leakage. Moreover, since a relatively low extension force is required to advance the ring plug assembly 76 and since the force produces no significant bending moments on the ring plug there is no tendency of the plug to deflect or distort in a manner which would decrease its sealing effectiveness. The shear assembly 41 may be retracted when flow control operations are completed by venting the expansible chamber 85 and allowing the return springs 81 to retract the plug assembly 76. Subsequently, the upper actuator chamber 107 may be vented while the lower chamber 109 is pressurized to drive the piston 96 and shear assembly 41 upwardly.

Figure 7:
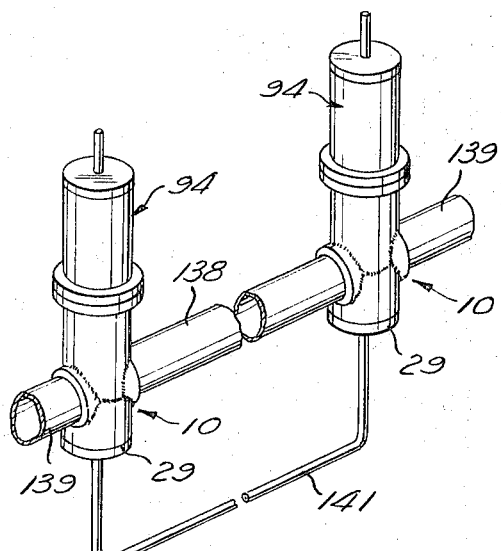
FIG. 7 is a perspective somewhat schematic view of a pair of apparatus connected to provide a by-pass pipe circuit.

Once the shear assembly 41 has cut through a portion of the pipe wall, fluid communication is established between the interior of the pipe 12 and the interior of the housing 11. After the section 129 is sealed by the ring plug assembly 76, fluid communication may be sustained between the opposite pipe section 131 and the lower housing chamber 36 through the flow passage 88 as indicated by the arrows 136 in FIG. 6. FIG. 7 schematically illustrates a method of bypassing a section of pipeline 138 in which it is desired to make a repair or alteration. The intermediate pipe section 138 may be isolated from remaining pipe sections 139 by providing a pair of flow control apparatus 10 at appropriate locations. The flow control apparatus at each location is arranged such that the ring plug assembly 76 faces the opposite control apparatus 10 so that the intermediate pipe section 138 may be sealed from the remaining pipe sections 139. An alternate bypass line 141 may be connected to the lower flanges 29 of each apparatus 10 so that flow may be maintained between the remaining pipe sections 139 through the flow passages 88 of each shear assembly 41.

Although a preferred embodiment of the invention is illustrated, it is to be understood that various modifications and rearrangements of parts may be resorted to without departing from the scope of the invention disclosed and claimed herein.

What is claimed is:

1. Apparatus for altering fluid flow in a conduit comprising a fluid tight housing adapted to be secured to the exterior of the conduit, cutter means within said housing, actuator means operable externally of said housing for moving said cutter means from a first position external of said conduit radially through a wall of said conduit to a second position external of said conduit and diametrically opposite said first position, conduit plugging means, said cutter means carrying said plugging means into said conduit when said cutter means moves from said first position to said second position, said plugging means including an annular sealing ring having inside and outside diameters substantially equal in size to the inside and outside diameters respectively of the conduit wall, hydraulic means for moving said annular sealing ring, independently of a force developed by pressure in a section of conduit being sealed by said ring on an area defined by the interior of the ring, axially into engagement with a severed end face of said conduit wall formed by said cutter means as it is moved from said first position to said second position.

2. Apparatus as set forth in claim 1 wherein said cutter means comprises a carrier block.

3. Apparatus as set forth in claim 2 wherein said carrier block includes an axially oriented annular recess, the inner and outer diameters of said recess being substantially equal to the inner and outer diameters respectively of said annular sealing ring, said annular sealing ring being slidably disposed in said recess.

4. Apparatus as set forth in claim 3 wherein said recess and said ring cooperate to form an expansible chamber, and said hydraulic means includes means to introduce fluid pressure into said chamber to extend said ring from said recess into a sealing position against said severed conduit face.

5. Apparatus as set forth in claim 4 including biasing means to return said ring from said extended sealing position into said recess upon venting of the expansible chamber.

6. Apparatus as set forth in claim 5 wherein said return means includes spring means biasing said ring into said recess.

7. In apparatus for altering fluid flow in a pipeline, a fluid tight housing adapted to be sealingly secured to the exterior of the pipeline, a shear and plugging assembly mounted in the housing for radial movement into the pipeline, said assembly including a shear having a pair of cutting edges on one of its faces, each of said edges lying in parallel planes substantially transverse to the axis of the pipeline, a carrier block having a cylindrical recess therein in axial alignment with the pipeline, and plugging means axially movable within said cylindrical recess, an actuator operable externally of the housing for forcing the shear radially through the pipeline to sever the pipeline across spaced planes, means to extend said pipe plugging means into sealing engagement with an end face formed on said pipeline by one of said cutting edges, the improvement wherein said pipe plugging means comprises a cylindrical ring having inside and outside diameters substantially equal to the inside and outside diameters, respectively, of said pipeline, said cylindrical recess having an annular configuration complementary to said ring, said ring being movable in said cylindrical annular recess by said extending means whereby axial pressure forces on the plug are minimized.

8. Apparatus for altering fluid flow in a conduit in service comprising a fluid tight housing adapted to be secured to the exterior of the conduit, combined cutter and sealing ring means in the housing, said combined cutter and sealing ring means including a carrier block for carrying said ring radially from a position lateral of the conduit into radial registration with an end face of the conduit wall in the housing, said ring having inside and outside diameters substantially equal in size to the inside and outside diameters of an end face of the conduit wall, and means for causing said ring to move axially on said carrier block independently of a force developed by pressure in a section of conduit being sealed by said ring on an area defined by the interior of the ring into sealing engagement with said end face when said ring is in radial registration with said conduit.

9. Apparatus as set forth in claim 8 wherein said carrier block includes an annular recess having an axis parallel to the axis of the conduit, said annular recess having inner and outer diameters being substantially equal to the inner and outer diameters, respectively, of said ring, said ring being slidable in said recess, and said movement causing means comprising an expansible fluid pressure chamber formed by said annular recess and said ring.

10. Apparatus for altering the flow of fluid in a conduit comprising a fluid tight housing adapted to be secured to the exterior of the conduit, means in the housing for cutting through the conduit wall to divide the conduit into two sections, said cutting means carrying selectively movable seal means to seal one section of the conduit from fluid communication with the interior of the housing, and flow passage means in said cutting means defining a flow path from the other conduit section into the interior of the housing while said one section is sealed by said sealing means.

11. Apparatus as set forth in claim 10 wherein said sealing means includes a plug movable radially between said conduit sections and axially into sealing engagement with said one conduit section.

12. Apparatus as set forth in claim 11 wherein said plug is mounted in a carrier block movable radially between said conduit sections, said carrier block providing said flow path means.

13. Apparatus for altering fluid flow in a conduit comprising a fluid tight housing adapted to be secured to the exterior of the conduit, a shear and plug assembly mounted in the housing for movement in a plane transverse to the axis of the conduit, said assembly including a shear having a pair of axially spaced cutting edges each in a plane transverse to the conduit, actuator means operable externally of the housing for forcing the shear through the wall of the conduit to sever the conduit into two sections, said assembly including a plug, carried on said shear, movable into radial alignment with the conduit and selectively axially movable into sealing engagement with an end face of the conduit formed by one of said cutting edges to seal one section of the conduit, and flow passage means in said shear defining a flow path providing fluid communication between the other section of the conduit and the interior of the housing.

14. Apparatus as set forth in claim 13 wherein said flow passage means includes a port between said cutting edges.

* * * * *